US007251564B2

(12) United States Patent
Posey et al.

(10) Patent No.: US 7,251,564 B2
(45) Date of Patent: Jul. 31, 2007

(54) SYSTEM AND METHOD FOR ESTIMATING OCEAN HEIGHT AND CURRENT ON A PERSONAL COMPUTER WITH HURRICANE MODULE

(75) Inventors: Pamela Posey, Carriere, MS (US); Ruth H Preller, Slidell, LA (US); Gretchen Dawson, Slidell, LA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/268,397

(22) Filed: Nov. 2, 2005

(65) Prior Publication Data

US 2007/0050141 A1 Mar. 1, 2007

Related U.S. Application Data

(60) Provisional application No. 60/712,607, filed on Aug. 23, 2005.

(51) Int. Cl.
*G01W 1/00* (2006.01)
(52) U.S. Cl. .............................................. 702/3; 702/5
(58) Field of Classification Search .................... 702/2, 702/3, 4, 5
See application file for complete search history.

(56) References Cited

U.S. PATENT DOCUMENTS 5,342,144 A * 8/1994 McCarthy .................... 405/39

6,346,193 B1 * 2/2002 Bauer ......................... 210/615

OTHER PUBLICATIONS

Blain, C.A., Preller, R.H., and Rivera, A.P., "Tidal Prediction Using the Advanced Circulation Model (ADCIRC) and a Relocatable PC-based System", Oceanography, vol. 15, No. 1, (Mar. 2002), pp. 77-87.
Preller, R.H., Posey, P.G., and Dawson, G.M. "Hurricane Isabel: A Numerical Model Study of Storm Surge Along the East Coast of the United States", American Meteorological Society Annual Meeting, Sixth Conference on Coastal Atmospheric and Oceanic Prediction and Processes, San Diego, Session P.2.9, (Jan. 2005), pp. 1-13.
Allard, R.A. and Dykes, J.D., "DIOPS: A PC-based Wave, Tide, and Surf Prediction Model", American Meteorological Society Annual Meeting, Sixth Conference on Coastal Atmospheric and Oceanic Prediction and Processes, San Diego, Session 4.11, (Jan. 2005), pp. 1-6.

* cited by examiner

*Primary Examiner*—Donald E McElheny, Jr.
(74) *Attorney, Agent, or Firm*—John J. Karasek; Sally A. Ferrett

(57) ABSTRACT

A system and method for estimating ocean surface height and currents at points within a geographic grid. The method includes receiving bathymetric data from a global database, generating atmospheric forcing information based on a hurricane model, and estimating current and ocean height deviation for at least one grid point. In exemplary embodiments, the system is rapidly relocatable, has worldwide coverage, and can run on a PC at user selected frequencies and worldwide locations.

17 Claims, 9 Drawing Sheets

| MODEL | BEAUFORT TIME 9/18/04 | BEAUFORT HEIGHT (m) | CAPE HATTERAS TIME 9/18/04 | CAPE HATTERAS HEIGHT (m) | DUCK TIME 9/18/04 | DUCK HEIGHT (m) | VIRGINIA BEACH TIME 9/18/04 | VIRGINIA BEACH HEIGHT (m) | CHESAPEAKE TIME 9/18/04 | CHESAPEAKE HEIGHT (m) | WINDMILL TIME 9/18-19/04 | WINDMILL HEIGHT (m) | SOLOMONS ISLAND TIME 9/19/04 | SOLOMONS ISLAND HEIGHT (m) | BALTIMORE TIME 9/19/04 | BALTIMORE HEIGHT (m) |
|---|---|---|---|---|---|---|---|---|---|---|---|---|---|---|---|---|
| COAMPS | 1800Z | 1.564 | 1700Z | 1.677 | 1812Z | 2.077 | 1824Z | 1.188 | 1900Z | 1.594 | 2200Z | 0.946 | 0424Z | 0.943 | 1336Z | 1.017 |
| NOGAPS | 1800Z | 1.466 | 1712Z | 1.419 | 0424Z | 1.523 | 1636Z | 1.452 | 1712Z | 1.346 | 2100Z | 0.930 | 0200Z | 1.025 | 0448Z | 1.032 |
| FORECAST 60 | 1700Z | 1.382 | 1036Z | 1.418 | 1500Z | 2.224 | 1724Z | 2.787 | 1836Z | 2.296 | 2324Z | 1.459 | 0348Z | 2.088 | 0912Z | 3.608 |
| FORECAST 90 | 1700Z | 1.385 | 0824Z | 1.534 | 1336Z | 2.078 | 1612Z | 2.783 | 1712Z | 2.425 | 2024Z | 1.401 | 0348Z | 2.320 | 0948Z | 4.499 |
| HINDCAST 70 | 2000Z | 1.363 | 1648Z | 2.301 | 1800Z | 2.005 | 1836Z | 1.761 | 1912Z | 1.120 | 0100Z | 0.656 | 1236Z | 1.213 | 1048Z | 1.948 |
| HINDCAST 90 | 2000Z | 1.504 | 1636Z | 2.376 | 1800Z | 2.254 | 1900Z | 2.081 | 1912Z | 1.283 | 0000Z | 0.800 | 1136Z | 1.484 | 1048Z | 2.483 |
| HINDCAST 100 | 1948Z | 1.591 | 1636Z | 2.352 | 1748Z | 2.387 | 1900Z | 2.245 | 1924Z | 1.375 | 0000Z | 0.874 | 1136Z | 1.593 | 1048Z | 2.690 |
| OBSERVATION | 1840Z | 1.754 | >1430Z | 2.341 | >1600Z | 2.383 | 1820Z | 2.297 | 1820Z | 2.297 | 2344Z | >1.060 | 0456Z | >1.363 | 1200Z | 2.483 |

MAXIMUM OBSERVED, FORECAST AND HINDCAST WATER LEVELS FOR 8 STATIONS

FIG. 8 ial appli- # SYSTEM AND METHOD FOR ESTIMATING OCEAN HEIGHT AND CURRENT ON A PERSONAL COMPUTER WITH HURRICANE MODULE

CROSS REFERENCE TO RELATED APPLICATIONS

This application claims the benefit of provisional application 60/712,607, filed in the U.S. on Aug. 23, 2005, the disclosure of which is incorporated herein in its entirety.

TECHNICAL FIELD

This invention is related to methods and computer programs for oceanographic prediction, and more specifically, for forecasting surface heights and currents.

BACKGROUND

Ocean models have been in use for several years for various purposes, for example, for predicting tidal heights and times of expected high tides and low tides. The importance of such tidal information is well known to all who work or recreate in or around coastal waters. Knowledge of the times, heights, and extent of the ebb and flow of tidal waters is of importance in a wide range of practical applications, including navigation through intra-coastal waterways; construction of bridges, docks, breakwaters, and deep water channels. The military, in particular the Navy, relies on tidal predictions for operational planning and execution in marine environments. Water depths at high tide can facilitate a beach landing, while later at the same location low tides may strand amphibious vehicles on muddy tidal flats. Tidal currents affect the positioning and/or movement of subsurface mines and Navy SEAL swimmers must gauge their heading based on the strength and direction of the tidal current.

Currently, to determine a tidal predication for a location other than a IHO tidal station, a user must manually look up the nearest tidal station in printed tide tables or refer to a database of fixed tidal stations, such as a database maintained by NAVOCEANO.

Tidal models including versions of the ADCIRC and PCTides models are described in C. A. Blain, R. H. Preller, A. P. Rivera, "Tidal Prediction Using the Advanced Circulation Model (ADCIRC) and a Relocatable PC-based System", Oceanography, Vol. 15, No. 1, 2002.

SUMMARY

One embodiment of the invention is directed to a system and method for estimating ocean surface height and currents at points within a geographic grid anywhere on the earth in an easily relocatable system. Bathymetric data is received from a database, boundary conditions of the grid are received from another database or model, and tidal data is received from at least one tidal station if available and desired. The system and model estimates a current and ocean height deviation for at least one point within the grid, including all grid points and optional user selected locations within the grid boundaries.

In an embodiment of the invention, a hurricane model generates atmospheric forcing data for the geographic grid, allowing the system and method to estimate storm surge at the grid points and optional user selected locations within the grid boundaries.

An embodiment of the system and method includes determining whether the user selected location has a water depth and if not, estimating the current and ocean height deviation for an adjacent point that does have a water depth.

Further details of embodiments of the invention are found with reference to the following figures and detailed description.

BRIEF DESCRIPTION OF THE DRAWING FIGURES

Figure 7:
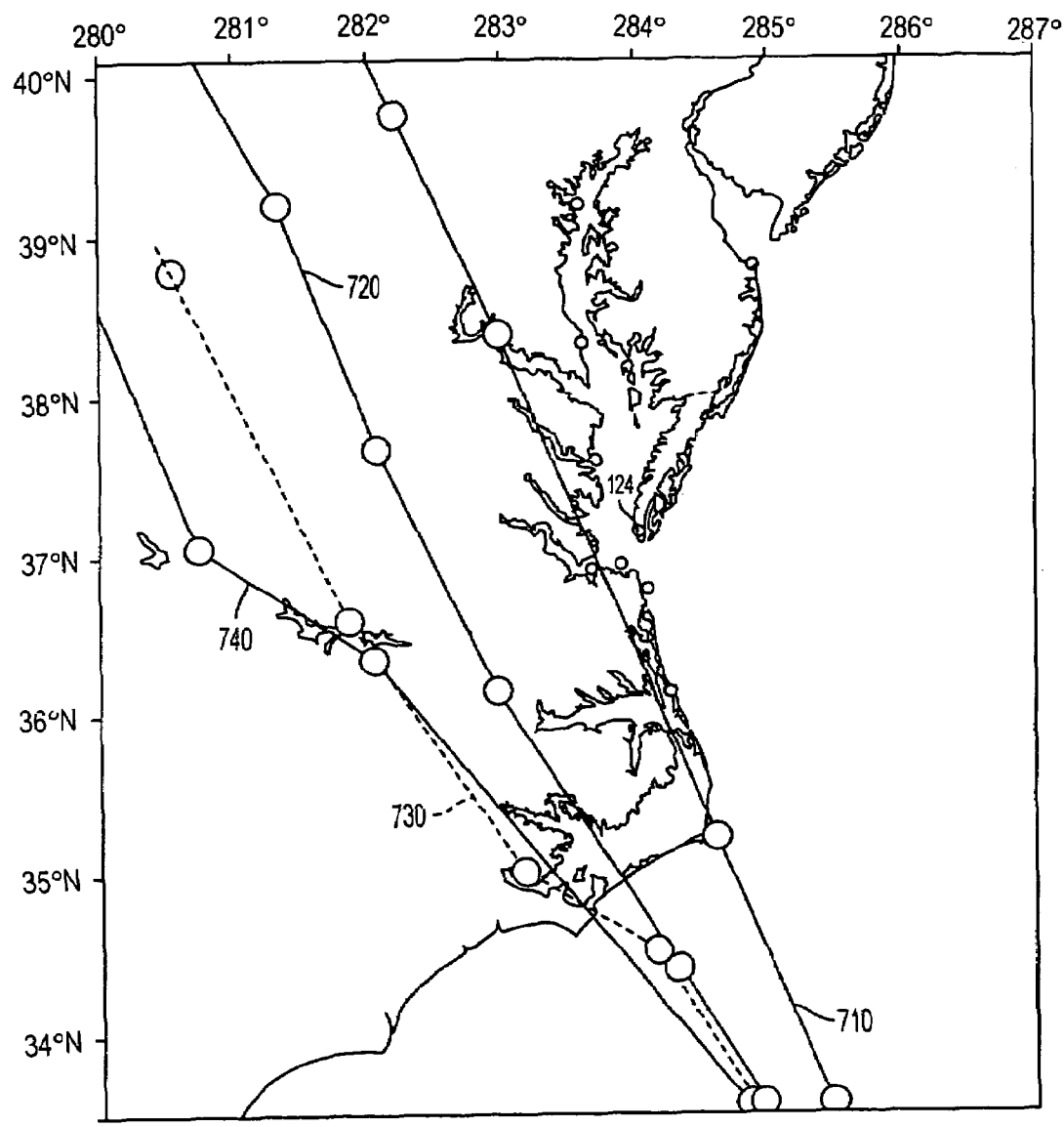

FIG. 7 graphically illustrates results of a method and system according to an embodiment of the invention, results of other models, and observations.

FIG. 8 illustrates in a tabular form the results of a method and system according to an embodiment of the invention, results of other models, and observations.

DETAILED DESCRIPTION OF PREFERRED EMBODIMENTS

The tide-generating forces that result from the gravitational attraction between the Earth, Sun, and Moon can be precisely formulated. In contrast, the response of the oceans to these forces is subject to modification by non-astronomical factors such as configuration of the coastline, local depth of the water, ocean floor topography, and other hydrographic and meteorological influences. These influences may play an important role in altering the tidal height range, the interval between high and low water, and times of arrival of the tides at a particular location.

A method and system described herein provide an advantageous capability for predicting sea surface elevations and currents forced by the tides. Existing tide tables created from historical elevation data can be used for tidal prediction, but their information is either sparsely located or based on outdated coastal geometry and/or topography. Further, tide tables contain little information for coastal waters that extend beyond the shoreline. Moreover, the tide tables cannot provide estimates of water velocity, and do not include any provision for atmospheric forcing.

The system and method described herein uses numerical models to provide high resolution, up-to-date forecasts of tidal elevations and currents. The models can ingest recent bathymetric measurements and include transient meteorological effects such as wind and atmospheric pressure. The spatial and temporal density of the forecast information can be readily tailored to specific applications and needs.

The tidal forecast system and method incorporates the following goals. The model forecast system should produce accurate values of the tidal heights and currents where accuracy is defined by some predefined range of error. The model forecast system should also be portable so as to operate on different computer platforms. The system should also be able to be used by multiple users in a variety of geographic regions and spatial scales.

Further, in an operational environment, the system should be able to automatically generate hourly or daily forecasts of sea surface height and currents without human intervention. This automation should encompass such tasks as the retrieval of forcing field products (e.g. surface winds and pressures) produced by operational meteorological models, the generation of a computational grid, model set-up and execution, and the creation of forecast products. The system should have computational run times and interfaces that are consistent with a real-time framework and the user's operational environment. Forecasts of sea surface elevation and currents should be timely and not outdated with respect to real time.

The system and method described herein provides a rapidly relocatable, global prediction capability for tidal heights and currents. The capability is particularly useful for locations where neither observations nor a regularly run operational tidal prediction model, such as ADCIRC, exists. By rapidly relocatable, it is meant that the system is rapidly configured for the location of interest and executes quickly on the available computers both PC and UNIX-based platforms.

In comparison to an ADCIRC model, often configured for regions covering more than 10 degrees of latitude and longitude, the system and model described herein is usually applied over much smaller area than 10 degrees of latitude and longitude. A suitable size region that can be modeled by the system and method is a region with dimensions of 300 km to 1000 km, although smaller or larger regions can also be modeled. A suitable resolution range is between 3 km and 10 km, although finer or coarser resolutions can also be used. Selections of the size and resolution will depend on the user's need for resolution, range, and speed of results. Larger grid sizes will produce faster results, however, the results may not be as accurate as if a smaller grid size was used.

The terms forecast and prediction are used generally to describe the generation of ocean height and currents for a period of time. The period can be the past ("hindcasts"), that can include the current time when the user is operating the system ("nowcasts"), as well as time periods in the future ("forecasts"). Hindcasts are useful for validating the system parameters by comparing the system's results to measured tidal height and/or current data.

Figure 1A:
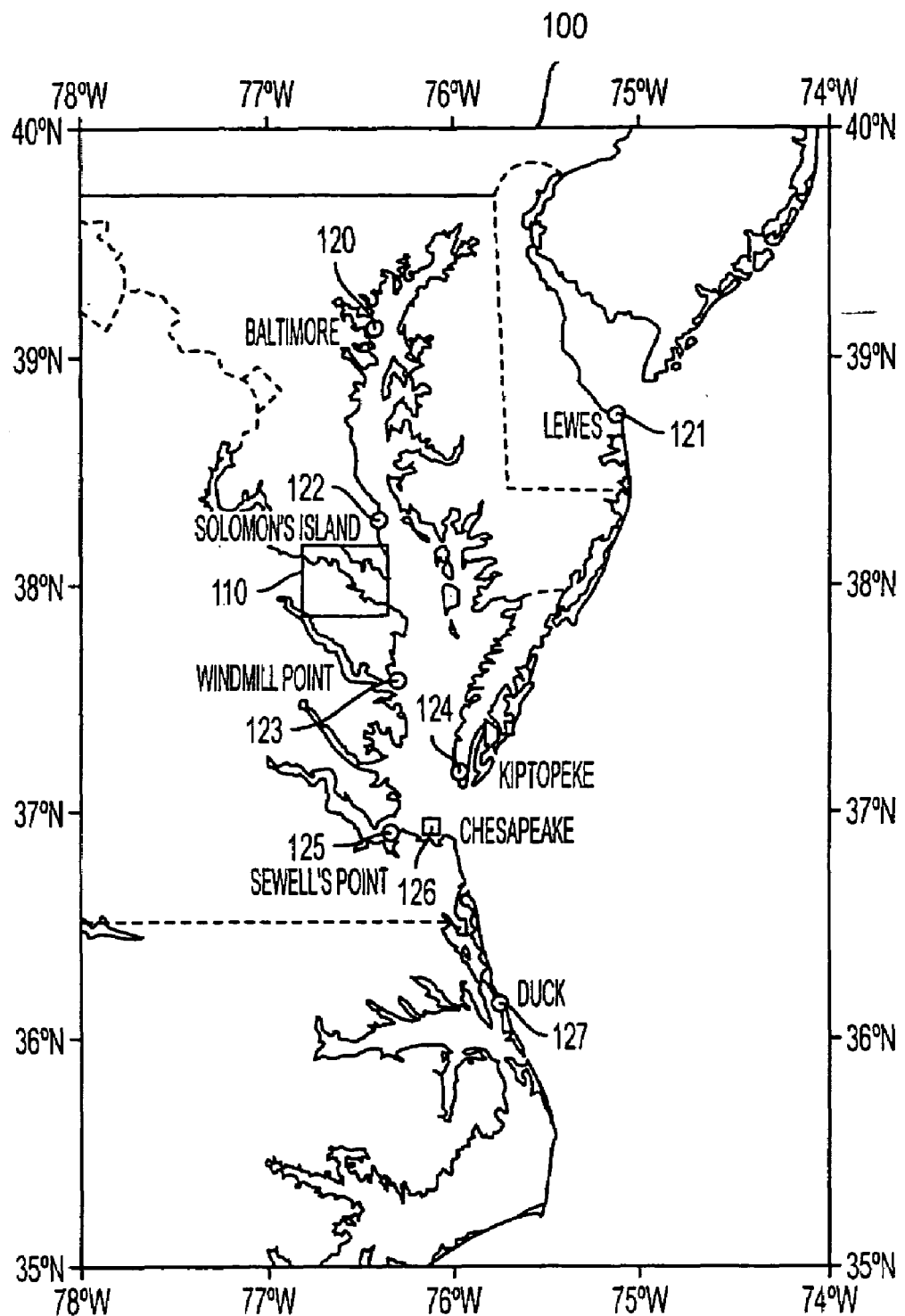
FIGS. 1A and 1B illustrates selection of a region by a user for tidal forecasting in accordance with an aspect of the invention.
Figure 1B:
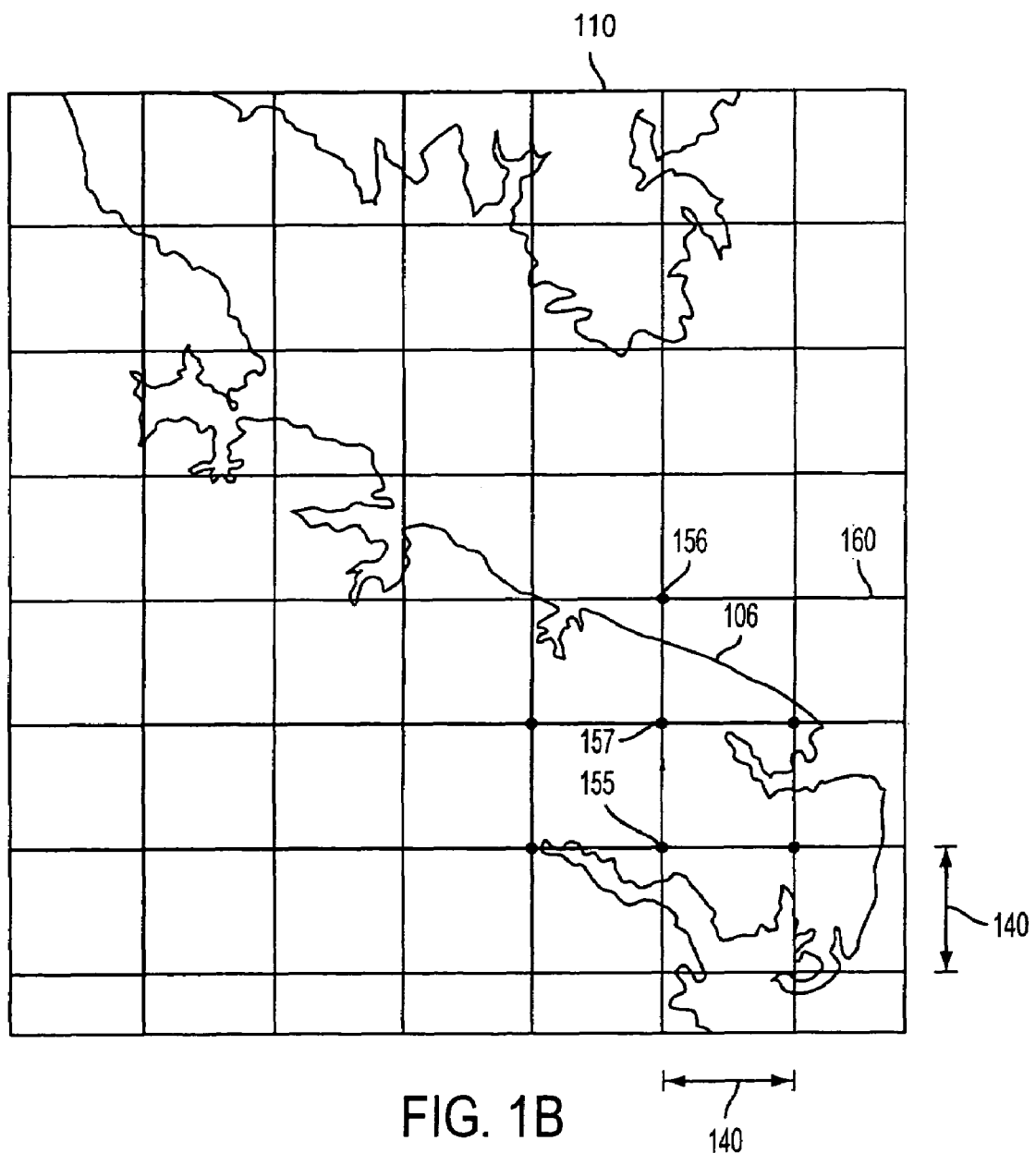

FIG. 1A illustrates an example of a user-selected region 100 for which tidal heights and tidal circulation forecasts are desired, and in particular is a 4.4 km resolution grid for the Chesapeake Bay region. FIG. 1B is an expanded view of a portion 110 of FIG. 1A. As discussed further in later paragraphs, the system determines which, if any, tidal observation stations are located within the region. If no tidal observation stations are located in the region, the system can operate without real-time tidal data. The coastline 106 is shown as a series of line segments joining points representing the coastline in a topographic/bathymetric database. Preferably, the topographic/bathymetric database is the Naval Research Laboratory's (NRL) DBDB2 database generated and maintained by the Naval Research Laboratory.

In an exemplary embodiment of a method for estimating ocean surface height and currents at points within a geographic grid, the user defines the region for which the forecast is desired by inputting the north, south, east and west extent of the region. The user can also define a model grid resolution 140. The system overlays a grid 160 with the selected resolution 140 on the region or domain 100. The grid is illustrated in the expanded view of FIG. 1B for clarity, although the grid is overlaid over the entire region 100.

Figure 2:
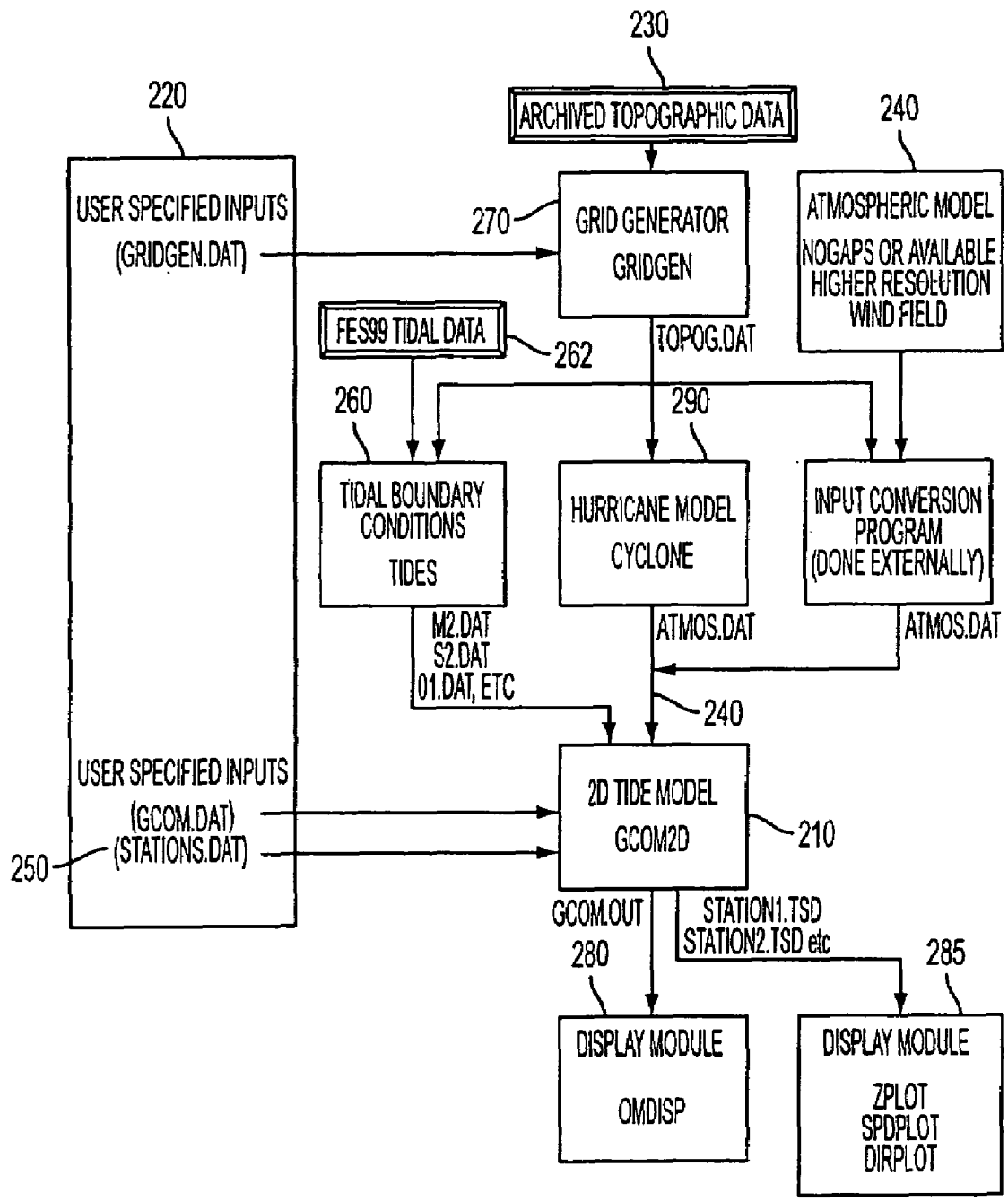
FIG. 2 is a schematic illustration the system and method for estimating ocean surface height and currents according to an embodiment of the invention.

FIG. 2 is a schematic 200 illustrating some features of the system and method described herein. Through a user interface 220, the system receives the grid boundaries, e.g., the region for which a model is desired, as well as the grid resolution, optional user-selected locations for forecasts, and a user-selected frequency of estimation for the forecast for the grid points.

Bathymetry data 230 is an input to the model. A preferred database is the bathymetry data currently available from the Naval Research Laboratory Digital Bathymetry Data Base with 2 minute resolution (NRL DBDB2), which is a global topography data set on a 2-min by 2-min uniform grid developed for the ocean model. The NRL DBDB2 version 3 is based on the Naval Oceanographic Office (NAVO) global 5-min DBDBV/DBDB5 bathymetry and includes all the DBDBV high resolution data. Other high resolution bathymetry data sets such as IBCAO (Arctic), DAMEE (Atlantic), MMS GOM01 (GOM), NAVO NGLI (NGOM), Choi's (JES/YES) and GA ABTG (Australia), are also incorporated. The Smith & Sandwell (1997) global seafloor topography from satellite altimetry and ship depth soundings are used for the deep water. The finest GMT (The Generic Mapping Tools) vector coastline data are applied to generate the land-sea mask. The GMT coastline data are a processed mix of a global coastline available from a U.S. government agency and the WVS (World Vector Shoreline) global coastline. To map the bathymetry data onto NRL DBDB2 grid two schemes have been applied. For those data which have lower than or compatible to 2-min resolution, a cub-spline method (Akima, 1970) is used. For those data with a higher than 2-min resolution, a weighted average with a 2D Gaussian weighting function is applied. A creeping scheme is used to merge the bathymetry data sets. The global land elevation data from NOAA NGDC GLOBE (based on USGS GTOPO30) is used on land.

In NRL's DBDB2 version 3, below 60S the SCAR (Scientific Committee on Antarctic Research) coastline data are used to generate the land-sea mask. The GMT coastline which was used in the DBDB2 v2.0 generally follows the ice edge in this area. The irregularities in the GA ABTG (Australia) were removed. A mismatch on the northwestern shelf of the Sea of Okhotsk (SOK) was removed by removing IBCAO data in SOK. A 1-min NCOR topography data set covering the Luzon Strait at the West Pacific was added. The USGS GTOPO30 30-sec land elevation data replaced the NOAA GLOBE data on the land.

The system 200 includes a barotropic ocean model 210 that is a 2-D depth-integrated shallow-water model that can model both currents and sea level heights on or near continental shelves. It contains a wetting and drying (inundation) algorithm for the simulation of coastal flooding due to tides and/or storm surge, discussed further in later paragraphs.

In the 2-D mode of operation, the model 210 considers the ocean to be one layer deep only so that for each grid within the region, only one layer is considered. The model 210 also includes a data-assimilative component to loosely constrain computed tidal heights using known sea-level elevations at available tidal stations using a weighted nudging approach. The user has the option to activate or inactivate the wetting and drying algorithm and the data assimilation capabilities through the user interface. A presently preferred embodiment for the model 210 is in a 2-D mode using data assimilation with no wetting/drying mechanism active.

Atmospheric forcing data that is input to the model 210 preferably includes 10 meter wind velocities in two directions u and v, and the surface pressure. The system has three modes available for considering atmospheric forcing. In a first mode, if atmospheric forcing information is not available or desired, the system can operate as a standalone system, providing global tidal-height forecasts without any external input.

In another mode, the model 210 receives atmospheric forcing data that is generated by the Navy Operational Global Atmospheric Prediction System (NOGAPS) system 240. Alternatively, the atmospheric forcing data can be generated by a Coupled Oceanographic and Atmospheric Mesoscale Prediction System (COAMPS™) model or a Coupled Oceanographic and Atmospheric Mesoscale Prediction System—On Scene (COAMPS-OS™) model, currently operated daily at Navy regional centers and available real-time for forecasts via the Navy's Metcast system. Metcast allows a user to request specific real-time atmospheric forecast products, and is available at http://metnet.nav.mil. The NOGAPS system 240 provides wind velocity and surface pressure. Further details of the NOGAPS model are available in Hogan, T. F. and Rosmond, T. E., "The description of the Navy operational global atmospheric prediction system's spectral forecast model", Mon. Wea. Rev., 119, pp 1786-1815 (1991). Further description of the COAMPS™ model is found in Hodur, R. M., "The Naval Research Laboratory's Coupled Ocean/Atmosphere Mesoscale Prediction System (COAMPS)", Mon. Wea. Rev., 125, pp 1414-1430 (1997).

In a third mode, the tidal model 210 can operate with a manual input of forcing data to be applied to all points in the grid. For example, if wind velocity and surface pressure are measured available at only one location, that wind velocity and surface pressure are input to the model as the atmospheric forcing data and applied to the entire grid.

The tidal station data that is input to the model 210 can be taken from the International Hydrographic Office (IHO) database (IHO tidal constituent bank, Special Pub. No. 50, pp 100, International Hydrographic Bureau, Monaco, 1988) or any other suitable database. The IHO data includes data from approximately 4,500 coastal stations.

The boundary conditions 260 that are input to the model for the region of interest include nine tidal harmonic constituents (M2, S2, K2, N2, O1, K1, Q1, 2N2, and P1) located at the open water boundaries of the ocean model, and are extracted from the FES99 global tide database 262 that can be found on the internet at "http://fabien.lefever.free.fr". Although the total "tide" is defined by a much larger set of harmonic constituents, these nine constituents provide a large percentage of the total tide.

For each grid point and for each selected location, the model 210 outputs a forecast value for the current speed and direction and a forecast value for the global tidal height anomaly. Output from the model 210 can be a graphic or text file of the tidal height time series at specified locations. A typical 48 hour forecast takes anywhere from 3 to 10 minutes of run time on a 500 MHz PC. The system and method can also be run on a computer having a faster or slower processor.

In a PC version of the system, the user interface 220 includes a graphic user interface (GUI) that allows the user to select a region from a global map using a "point and click" technique and to select the resolution of the model grid. A UNIX version of the system runs by editing input files and executing programs.

The user interface allows several types of user inputs. The user defines the region of forecast by inputting the north, south, east, and west extent of the region and the model grid resolution. Alternatively, the user can identify the forecast region by clicking on desired boundaries of the region visible in a computer screen image. The user can also instruct the system to interpolate tidal heights from the global database to the model grid. The user can identify the starting date and length of the forecast (e.g., 48 hours) by generating a parameter file with this information. In a case where wind forcing is available and used as an input to the model, the length of the available wind forecast determines the length of the tidal height forecast. The user can also identify how frequently the model should generate output files. For example, in a presently preferred embodiment, a suitable time interval is greater than or equal to 10 minutes.

The user can also select one or more specific locations for which forecasts are needed. These station locations can be proposed landing sites, locations for search and retrieval operations, or locations for salvage operations, for example. In a preferred embodiment, the forecasts for the selected locations can have a greater frequency (e.g., 10-12 minutes apart) than the forecasts for the other grid points. However, it is also suitable that the frequency of the forecasts for the user-selected locations can have the same frequency or a lower frequency than the other grid points.

After receiving user input via the user interface 220, a grid generation module 270 generates the grid and bathymetry is automatically interpolated to the grid from the global bathymetry database. In an exemplary embodiment, the grid generation module 270 determines which grid points correspond to above-water level (land) locations by referring to a bathymetric and/or topographic databases, and initializes the system so that the tide forecast of tide model 210 is not run for those grid points. The system 200 can limit the grid size so that the size of the two dimensional grid overlaid on the region does not exceed 500×500 grid points.

Based on the region selected by the user, the system 200 identifies tidal stations present within the grid box (selected region or domain 100), and assimilates the real time IHO tidal data for the tidal stations within the grid box. For example, for the region 100 shown in FIG. 1, eight tidal stations 120, 121, 122, 123, 124, 125, 126, and 127 are present. If no tidal station were present within the grid box, the model would operate without assimilating the real time tidal data. If desired, the IHO tidal data can be used for model validation. For example, the model can be run with the IHO tidal station as the user-selected location for a forecast, and the measured results at the IHO tidal station can be compared with the model output for that location.

After running the forecast, the system 200 outputs the results for display, repeating the forecast at the desired interval until the selected forecast period is complete.

In an exemplary embodiment, after the tide model 210 has generated results for each grid point, the system's inundation algorithm is used to determine which points that were previously above the water level (land points) are now underwater as a result of the tide and atmospheric forcing. Further details of the inundation algorithm are provided in later paragraphs.

System outputs includes tidal heights and barotropic ocean currents at the pre-selected station locations and at each grid point. The time series of forecasts for each location is written to a file containing station location, date, time, tidal elevation, and current speed and direction. The model can provide the forecasts as printed text files or plotted as a time series curve.

In a preferred embodiment, the tidal height output is the deviation from a mean water level, and more particularly, is the deviation from the mean sea level. For example, the deviation might be 1.2 meters above mean sea level. It is also suitable for the tidal height output to have other units and be based on other reference levels, such as, for example, mean low water or mean high water.

Figure 3:
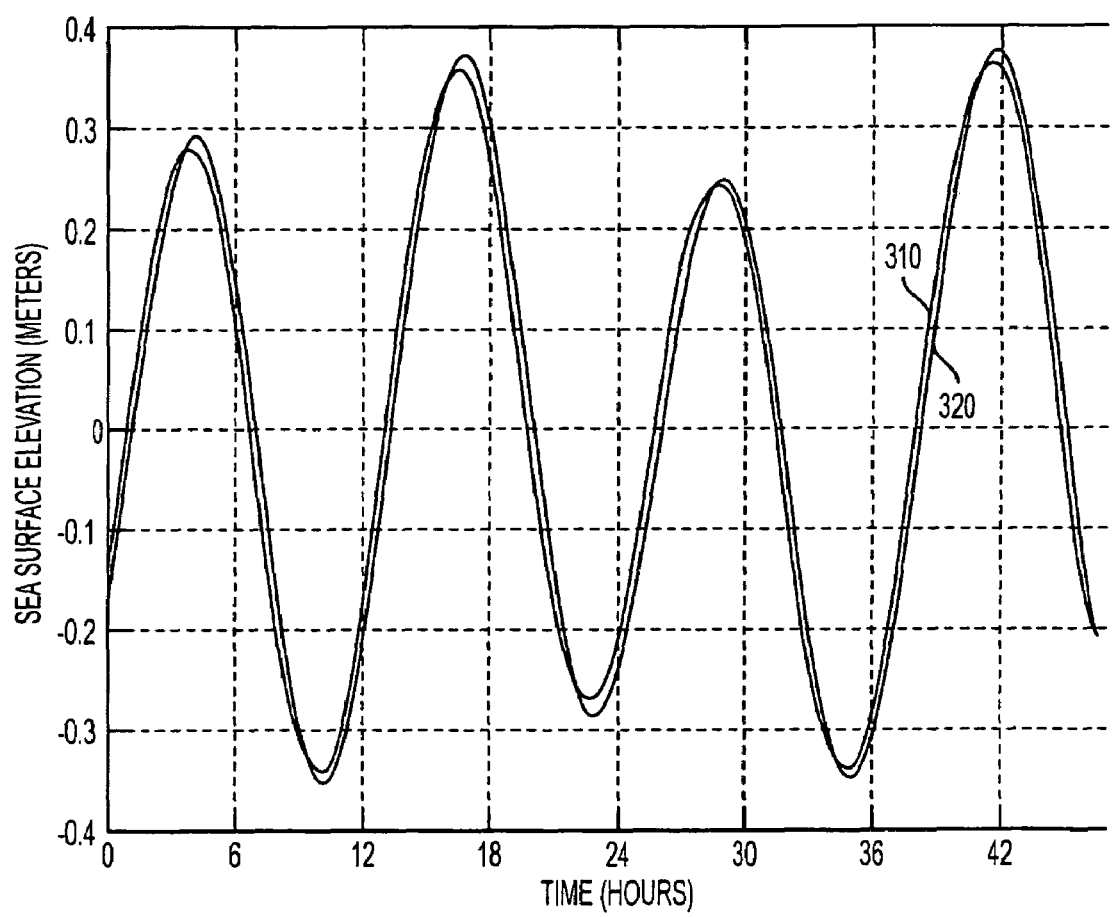
FIGS. 3 and 4 illustrate ocean surface height and currents outputs generated by a system and method according to an aspect of the invention.

FIG. 3 illustrates a time series curve 310 resulting from operating the system 200 for a location 120 in the Chesapeake Bay grid of FIG. 1. The location 120 was selected to correspond to an IHO tidal station for comparison purposes. The curve 320 is the measured sea surface height at the tidal station.

Figure 4:
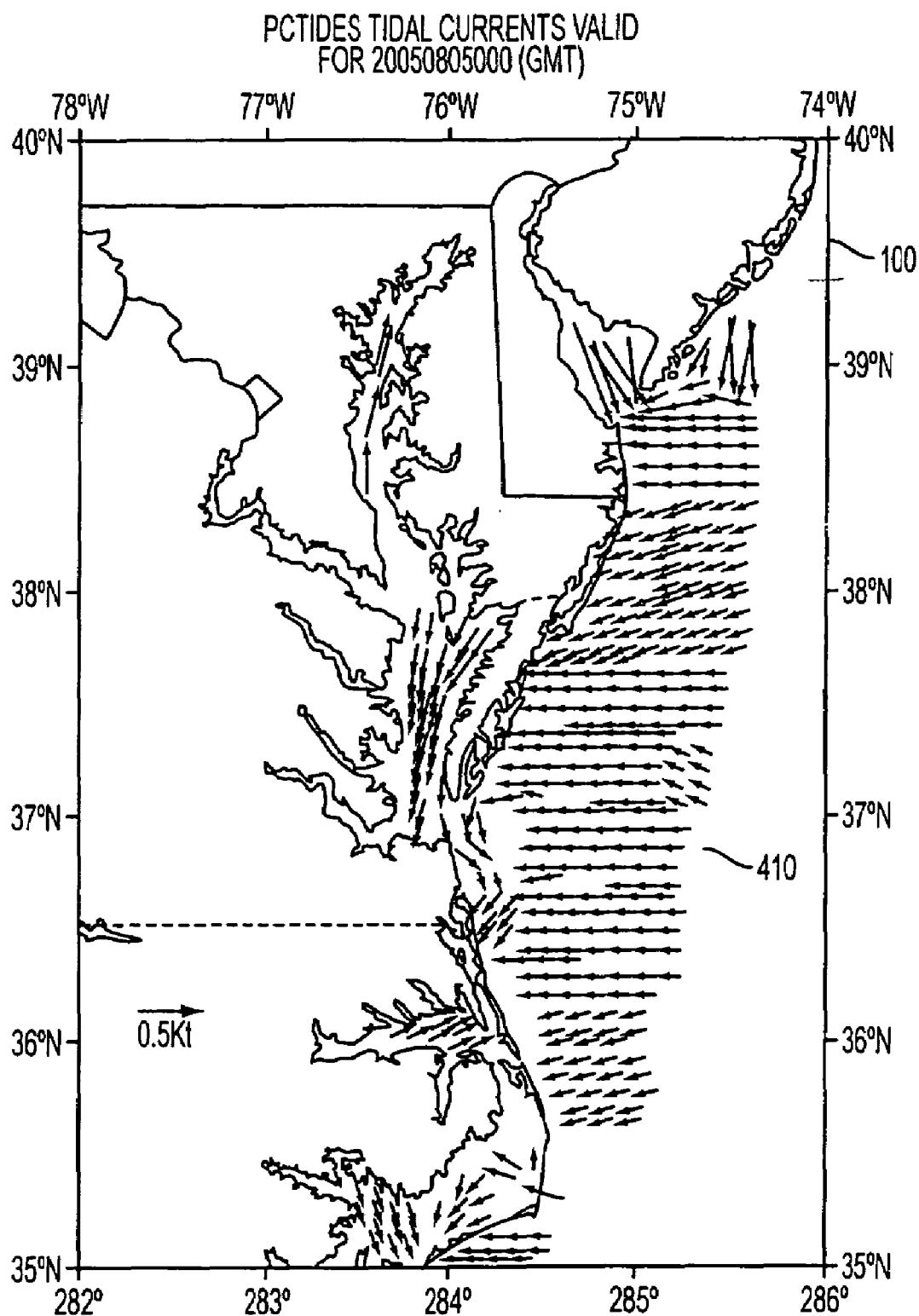

FIG. 4 illustrates the output of currents generated from operating the system 200 for the same location in the Chesapeake Bay grid of FIG. 1. The length and direction of the arrows 410 indicates the current speed and direction at that location a particular time in the predictive period. The output screen shows how the direction and speed of the current changes, by showing the length and direction of the arrows changing on the screen.

In an exemplary embodiment of the system and method for tidal prediction, the system is implemented in computer software using Fortran 90 language, although other computer programming languages are also suitable.

In an exemplary embodiment, the tide model 210 solves the shallow water equations:

$$\frac{\partial U}{\partial t} = fV - mg\frac{\partial \zeta}{\partial x} - \frac{m}{\rho_\omega}\frac{\partial P}{\partial x} - m\left(U\frac{\partial U}{\partial x} + V\frac{\partial U}{\partial y}\right) + \tag{1}$$
$$\frac{1}{\rho_\omega H}\left(\tau_{sx} - \tau_{bx} - \frac{\partial S_{xx}}{\partial x} - \frac{\partial S_{xy}}{\partial y}\right) - \nu\nabla^2 U,$$

$$\frac{\partial V}{\partial t} = -fU - mg\frac{\partial \zeta}{\partial y} - \frac{m}{\rho_\omega}\frac{\partial P}{\partial y} - m\left(U\frac{\partial V}{\partial x} + V\frac{\partial V}{\partial y}\right) + \tag{2}$$
$$\frac{1}{\rho_\omega H}\left(\tau_{sy} - \tau_{by} - \frac{\partial S_{yx}}{\partial x} - \frac{\partial S_{yy}}{\partial y}\right) - \nu\nabla^2 V,$$

$$\frac{\partial \zeta}{\partial t} = -m^2\left[\frac{\partial}{\partial x}\left(\frac{UH}{m}\right) + \frac{\partial}{\partial y}\left(\frac{VH}{m}\right)\right], \tag{3}$$

where U and V are the depth averaged currents in the x and y directions respectively, H is the total depth, $\zeta$ is the surface elevation, f is the Coriolis parameter, g is the acceleration due to gravity, P is the atmospheric surface pressure, $\rho_w$ is the water density, $\nu$ is the coefficient of lateral eddy diffusion and has a value of 0.2, $\tau_{bx}$ and $\tau_{by}$, the bottom frictional stress in the x and y directions, respectively. $S_{xx}$, $S_{yy}$, $S_{xy}$, and $S_{yx}$ represent the wave radiation stresses.

The equations have been formulated on a Cartesian grid, however, the formulation is generalized to incorporate different map projections through the appropriate specification of the map factor, m, a scaling factor dependent on the chosen map projection of the model grid. In accordance with this generality, the Coriolis parameter varies with latitude.

In addition, the surface wind stress components are computed using the quadratic relationship:

$$\tau_{sx} = C_D \rho_a |u_a| u_a, \quad \tau_{sy} = C_D \rho_a |u_a| v_a, \tag{4}$$

where $|u_a| = (u_a^2 + v_a^2)^{1/2}$ $u_a$ and $v_a$ are the horizontal components of wind height, $\rho_a$ is the density of air, and $C_D$ is the drag coefficient $$C_D = [0.63 + 0.066|u_a|] \times 10^{-3}, \quad |u_a| < 25 \text{ ms}^{-1};$$

$$C_D = [2.28 + 0.033(|u_a| - 25)] \times 10^{-3}, \quad |u_a| \geq 25 \text{ ms}^{-1}. \tag{5}$$

The bottom stress is represented by a Manning's n depth-dependent friction relation:

$$\tau_{bx} = \rho_w \frac{gn^2}{(H+\zeta)^{1/3}}(U^2+V^2)^{1/2} U, \tag{6}$$

$$\tau_{by} = \rho_w \frac{gn^2}{(H+\zeta)^{1/3}}(U^2+V^2)^{1/2}$$

where n has the value 0.03. This formulation ensures that the drag coefficient increases with decreasing water depth and is applied to water depths greater than 1 m. In extremely shallow water and over land points that become inundated, drag coefficients can be specified at each grid-point according to the terrain type.

Figure 5:
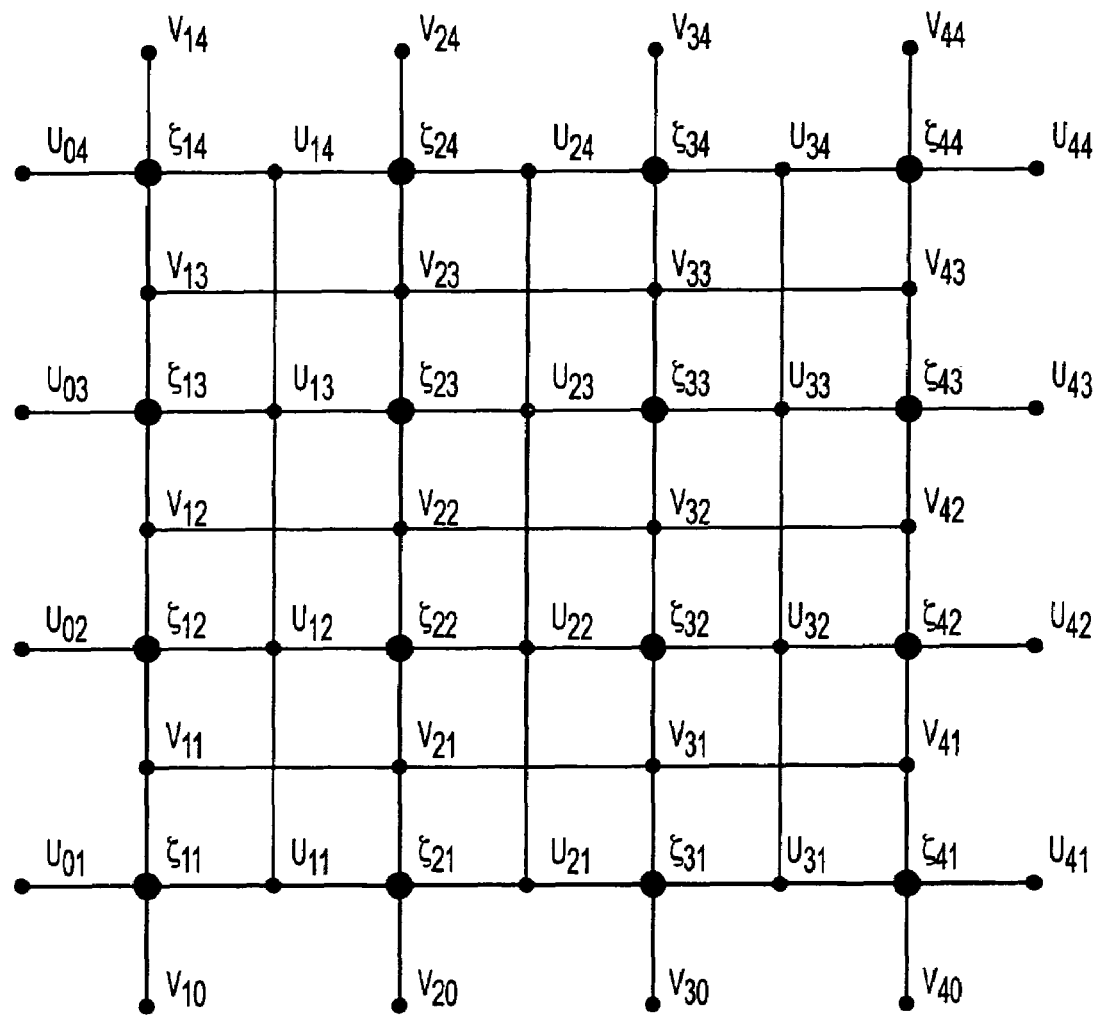
FIG. 5 illustrates a suitable Arakawa-C grid for solving shallow water equations by a split-explicit finite-difference method.

Equations (1) to (3) can be solved using a split-explicit finite-difference scheme on an Arakawa-C grid shown in FIG. 5. The continuity equation and the gravity wave and Coriolis terms in the momentum equations are solved on the shortest time step, known as the adjustment step, using the forward-backward method. The non-linear advective terms can be solved on an intermediate advective time step using the two-time-level method of Miller and Pearce (1974). Finally, on the longest time step, the so-called physics step, the surface wind stress, bottom friction stress and atmospheric pressure terms are solved using a backward-implicit method. This approach is extremely efficient in oceanographic models with free surfaces because of the large disparity between advective speeds and gravity-wave phase speeds in deep water.

Exemplary adjustment, advective, and physics steps are as follows.

Adjustment step: By defining $$m_{ij}^u = (m_{ij} + m_{i+1,j})/2$$

$$m_{ij}^v = (m_{ij} + m_{ij+1})/2$$

$$H_{ij}^u = (H_{ij} + H_{i+1,j})/2$$

$$H_{ij}^u = (H_{ij} + H_{i+1,j})/2$$

and noting that the grid spacing at the standard latitude of the map projection is represented by $\Delta s = \Delta x = \Delta y$, the adjustment step is accomplished by $$\zeta_{ij}^{t+\Delta t} = \zeta_{ij}^t - m_{ij}^2 \frac{\Delta t}{\Delta s}\left\{\frac{(UH^u)_{ij}^t}{m_{ij}^u} - \frac{(UH^u)_{i-1,j}^t}{m_{i-1,j}^u} + \frac{(VH^v)_{ij}^t}{m_{ij}^v} - \frac{(VH^v)_{ij-1}^t}{m_{ij-1}^v}\right\} \tag{7}$$

The velocity components are then computed using the latest values of the surface elevation in the implicit relationship of equation 8.

$$U_{ij}^* = U_{ij}^t + \Delta t\left\{fV_{ij}^* - m_{ij}^u g\left(\frac{\partial \zeta}{\partial x}\right)_{ij}^{t+\Delta t}\right\} \tag{8}$$

$$V_{ij}^* = V_{ij}^t - \Delta t\left\{fV_{ij}^* - m_{ij}^v g\left(\frac{\partial \zeta}{\partial y}\right)_{ij}^{t+\Delta t}\right\} \tag{9}$$

These equations may be rewritten directly in the explicit form to obtain the intermediate asolutions U* and V*.

$$U_{ij}^* = \tag{10}$$
$$\frac{1}{(1+f^2\Delta t^2)}\left[U_{ij}^t - m_{ij}^u g \Delta t\left(\frac{\partial \zeta}{\partial x}\right)_{ij}^{t+\Delta t} + f\Delta t\left\{\overline{V}_{ij}^t - m_{ij}^u g \Delta t\left(\frac{\partial \zeta}{\partial y}\right)_{ij}^{t+\Delta t}\right\}\right]$$

$$V_{ij}^* = \tag{11}$$
$$\frac{1}{(1+f^2\Delta t^2)}\left[V_{ij}^t - m_{ij}^v g \Delta t\left(\frac{\partial \zeta}{\partial y}\right)_{ij}^{t+\Delta t} - f\Delta t\left\{\overline{U}_{ij}^t - m_{ij}^v g \Delta t\left(\frac{\partial \zeta}{\partial y}\right)_{ij}^{t+\Delta t}\right\}\right].$$

where $$\overline{U}_{ij}^t = (U_{ij}^t + U_{ij+1}^t + U_{i-1j}^t + U_{i-1j+1}^t)/4 \text{ and}$$

$$\overline{V}_{ij}^t = (V_{ij}^t + V_{i+1j}^t + V_{ij-1}^t + V_{i+1j-1}^t)/4$$

Equations (7), (10) and (11) are solved $N_a$ times so that the adjustment step advances the intermediate solution to the values U* and V* at time $t+\Delta t_a$, where $\Delta t_a = N_a \Delta t$.

Advective step: The two-time-level method of Miller and Pearce alternates the Euler and Euler-backward schemes at odd and even advective time-steps and has the major advantage of an amplification factor that is almost exactly unity for the Courant numbers that are found in ocean models.

On the odd advective time-steps, the updated intermediate solutions U and V are $$U_{ij}^{**} = (U_{ij}^* + \Delta t_a F(U_{ij}^*)_a \tag{12}$$

$$V_{ij}^{**} = (V_{ij}^* + \Delta t_a G(V_{ij}^*)_a \tag{13}$$

with the advective operators F and G defined by $$F(U_{ij}^*) = -\frac{m_{ij}^u}{4\Delta s}\{(U_{i+1j}^* + U_{ij}^*)(U_{i+1j}^* - U_{ij}^*) + (U_{ij}^* + U_{i-1j}^*)(U_{ij}^* - U_{i-1j}^*) +$$
$$(V_{i+1j}^* + V_{ij}^*)(U_{ij+1}^* + U_{ij}^*) + (V_{ij-1}^* + V_{i+1j-1}^*)(U_{ij}^* + U_{ij-1}^*)\}$$

and $$G(V_{ij}^*) = -\frac{m_{ij}^u}{4\Delta s}\{(U_{ij+1}^* + U_{ij}^*)(V_{i+1j}^* - V_{ij}^*) + (U_{i-1j}^* + U_{i-1j+1}^*)(V_{ij}^* - V_{i-1j}^*) +$$
$$(V_{ij+1}^* + V_{ij}^*)(V_{ij+1}^* - V_{ij}^*) + (V_{ij}^* + V_{ij-1}^*)(V_{ij}^* + V_{ij-1}^*)\}.$$

On the even advective time-steps, a two-step Euler-backward scheme is applied instead of equations (12) and (13). On the second iteration, the values of U and V obtained after the first iteration are substituted into the advective operators F and G to obtain the final values of U and V.

Physics step: The adjustment and advective integration cycle is carried out $N_p$ times so that the interim solution is U and V at time $t+\Delta t_p$, where $\Delta t_p = N_p \Delta t_a = N_p N_a \Delta t$. At this time, the solution cycle is completed with the inclusion of the physics terms using a numerical technique similar to that described for the adjustment step. The final value of U is therefore $$U_{ij}^{t+\Delta t_p} = U_{ij}^{**} + \frac{\Delta t_p}{\rho_w}\left[\frac{1}{H_{ij}^u}(\tau_{sx} - \tau_{bx}) - \frac{m_{ij}^u}{\Delta s}(P_{i+1j}^a - P_{ij}^a)\right] \tag{14}$$

$$= U_{ij}^{} + \frac{\Delta t_p}{\rho_w}\left[\frac{\tau_{sx}}{H_{ij}^u} - \frac{\rho_w}{H_{ij}^u}KU_{ij}^{t+\Delta t_p}(U_{ij}^{2} + \overline{V}_{ij}^{**2})^2 -\right.$$

$$\left.\frac{m_{ij}^u}{\Delta s}(P_{i+1j}^a - P_{ij}^a)\right]$$

Rewriting in explicit form gives $$U_{ij}^{t+\Delta t_p} =$$
$$U_{ij}^{} + \frac{\Delta t_p}{\rho_w}\left[\frac{\tau_{sx}}{H_{ij}^u} - \frac{m_{ij}^u}{\Delta s}(P_{i+1j}^a - P_{ij}^a)\right] \bigg/ \left[1 + \frac{\Delta t_p}{H_{ij}^u}K(U^{2} + \overline{V}_{ij}^{**2})^{1/2}\right]$$

and $$V_{ij}^{t+\Delta t_p} = V_{ij}^{} + \frac{\Delta t_p}{\rho_w}\left[\frac{\tau_{sy}}{H_{ij}^v} - \frac{m_{ij}^v}{\Delta s}(P_{ij+1}^a - P_{ij}^a)\right] \bigg/ \left[1 + \frac{\Delta t_p}{H_{ij}^v}K(\overline{U}^{2} + V_{ij}^{**2})^{1/2}\right]$$

The numerical method therefore is split-explicit and consists of three distinct time steps $\Delta t$, $\Delta t_a$ and $\Delta t_p$ where $\Delta t \leq \Delta t_a \leq \Delta t_p$.

Boundary conditions can be applied in a range of ways depending on the type of process being modeled. Meteorological forcing is applied via the wind stress and surface pressure gradient terms in equations (1) to (3) at all submerged model grid-points in the computational domain.

Tidal and meteorological forcing at lateral boundaries is achieved by specifying the incremental displacement of the water surface due to changes in tidal height and atmospheric barometric displacement. The lateral boundary conditions are applied using a "one-way nesting" technique. The boundary conditions are applied to the appropriate model variable ϕ (representing height or velocity) with decreasing intensity from the boundary to some specified number of model grid-points (typically about 12) into the domain according to the equation (15).

$$\phi = (1-\alpha)\phi_p + \alpha\phi_b \tag{15}$$

where $\phi_p$ is the model predicted value and $\phi_b$ is the prescribed boundary value and α is varied according to a cosine function such that $$\alpha = 0.5(\cos \pi(1 - n/n_{max}) + 1), n=1, n_{max} \tag{16}$$

At coastal boundaries and along riverbanks, the wetting and drying of grid cells is accomplished via the inundation algorithm described in the following paragraphs. On outflow, a radiation boundary condition can be applied to the velocity field to prevent the build up of wave energy within the numerical domain, while on inflow boundaries, a zero-gradient condition is applied.

The system 200 can be initialized by setting velocities to zero and interpolating the global Finite Element Solutions versions 99 (FES 99) elevation field to the model grid. In an exemplary embodiment, an initial spin-up period allows the effects of the boundary forcing and tidal conditions to propagate throughout the computational domain. An appropriate spin-up time for the model using wind forcing is 24 hours and without wind forcing is 12 hours.

Adjustment of coastlines to account for flooding and draining takes place after equations (1)-(3) have been solved as described above. The coastal boundary is configured to pass through the velocity grid-points on the staggered grid in a stepwise manner such that it passes through the U points in the y-direction and through V points in the x-direction. The velocities on the boundaries are assumed to be zero.

A first step in adjusting the coastlines to account for flooding and draining is to calculate the distance in the x- and y-directions that fluid could travel in a time step at each ζ grid-point that is adjacent to the coast. The depth-averaged current velocity used in this calculation is taken at the first grid-point on the seaward side of the ζ grid-point. The travel distance is:

$$\Delta X_{i,j}^n = \begin{cases} \Delta X_{i,j}^n + \Delta t U_{i-1,j}^n, & U > 0 \\ \Delta X_{i,j}^{n-1} + \Delta t U_{i,j}^n, & U < 0 \end{cases} \quad (17)$$

$$\Delta Y_{i,j}^n = \begin{cases} \Delta Y_{i,j}^{n-1} + \Delta t V_{i,j-1}^n, & V > 0 \\ \Delta Y_{i,j}^{n-1} + \Delta t V_{i,j}^n, & V < 0 \end{cases} \quad (18)$$

where $\Delta X_{i,j}^{n-1}$ and $\Delta Y_{i,j}^{n-1}$ are the distances in the x and y directions that the water traveled in the previous time step. By factoring in the travel time of the fluid, inland grid cells are prevented from automatically becoming inundated at the first instant the water level at the coast exceeds the height of the adjacent dry points. In equations (17) and (18), the first option applies to flooding in the positive x or y direction (or draining in the negative x and y direction) while the second option applies to flooding in the negative x and y direction (or draining in the positive x and y direction).

The testing for coastline movement proceeds in the x- and y-directions separately. If the height of the water at the first z-point seaward of the coastline exceeds the topographic height at the first z-point landward of it, and the accumulated distance traveled in the given direction exceeds the grid separation, then a new sea-point is added to the computational domain. The velocity at the newly acquired velocity point is extrapolated from adjacent points and the continuity equation is solved to obtain the water depth at the new height point. Finally, $\Delta X_{i,j}^n$ and $\Delta Y_{i,j}^n$ are set to zero.

The procedure for draining is similar. If the height of the fluid at the height point adjacent the boundary drops below some arbitrary positive height, $\epsilon$ and the accumulated distance traveled by the fluid, exceeds the grid length, then draining is assumed to have occurred. The height grid-point is reclassified as dry (i.e. $\zeta = 0$) and the boundary relocated to the adjacent wet velocity grid-point.

In order to improve the simulation of tidal forced dynamics a facility is included to "nudge" the model solution with tidal height predictions at tidal stations within the model domain. Global tidal station constituent data is stored in ASCII format in a file. Stations could be added by adding to this file in the appropriate format.

During a model run the file of tidal station constituent data is scanned by a subroutine during its first call and the tidal constituent parameters for stations within the model domain are stored. At each model time step the tidal height is predicted at each station and used to "nudge" the model solution.

The nudging method is based on deriving a new solution at grid points near each tidal station from a weighted combination of the model solution and the station sea level prediction. The weighting function is calculated from the product of a parameter WGTFAC (default value=0.50) and the half cosine function (range=0 to 1) used for nesting. The weighting of the station sea level prediction goes to zero at a defined distance from each station, determined by the parameter ZRADIUS (default value=40 kms). The values of WGTFAC and ZRADIUS can be changed if desired.

FIG. 1B illustrates a notable feature of the system 200. In some other tide modeling systems, a general mismatch between coastline information and bathymetric data can produce incongruous results. In the presently preferred embodiment, the system tide model 210 evaluates each point identified by the user for a forecast by latitude and longitude (e.g., the proposed landing point), and determines whether the location is on land or in the water by checking the water depth for that location in the bathymetric database. If the location is on land, the system does not run a forecast for that location, and instead runs the forecast for the grid point closest to the desired location that does have a water depth. For example, if the user has identified location 155 in FIG. 1B for a forecast, the system 200 checks the bathymetry data for the location 155 and determines that it is not covered with water according to the bathymetry data. The system then evaluates the closest grid point 157 and determines that is also not covered with water, and continues checking adjacent grid points in an outward direction until it finds the closest grid point 156 that is covered with water according to the bathymetry database. The tide model 210 then runs the forecasts for that nearest grid point 156 rather than for the originally selected location 155.

Figure 6:
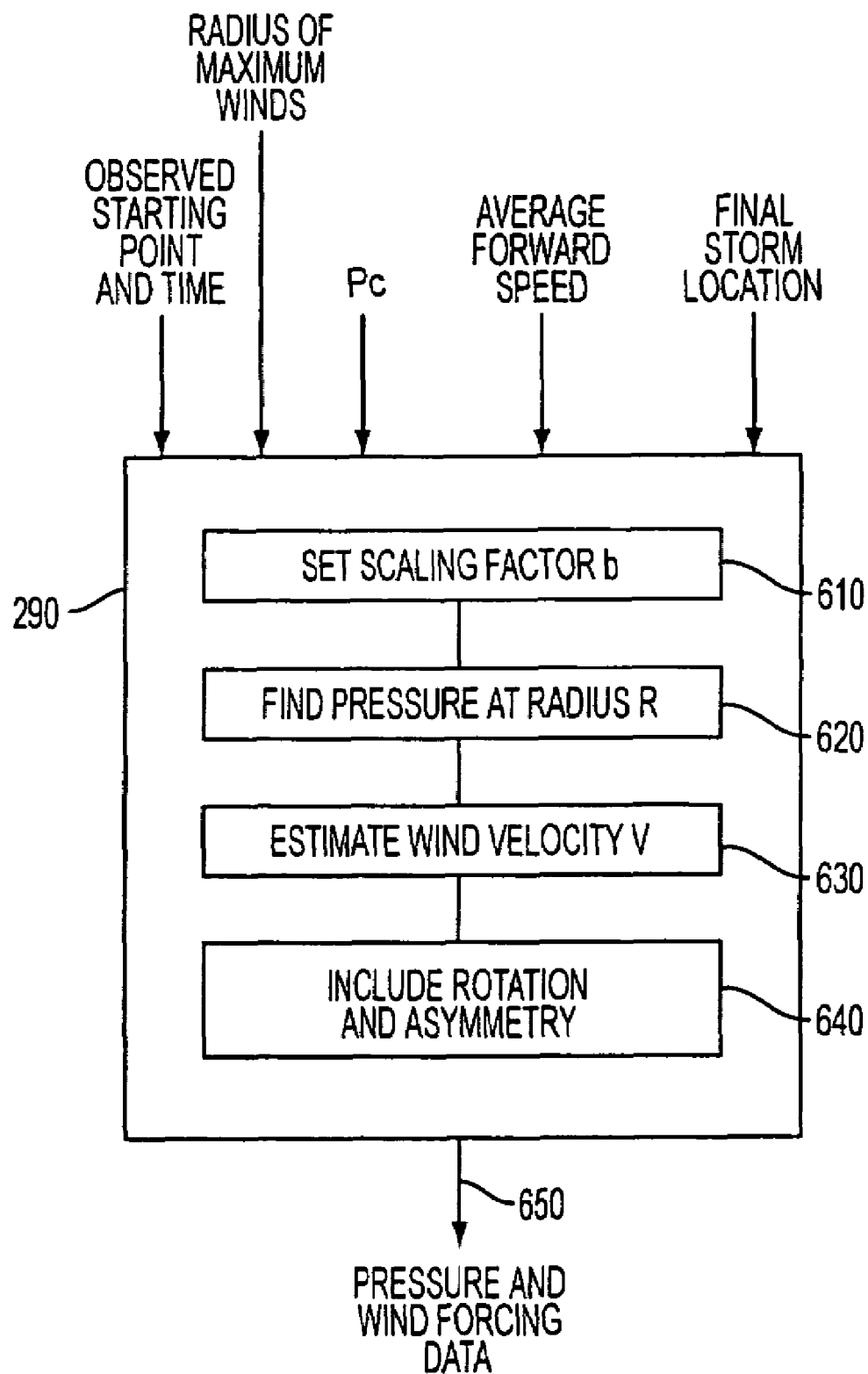
FIG. 6 illustrates aspects of a hurricane model incorporated into embodiments of the invention.

Further details of the hurricane model 290 are illustrated in FIG. 6. As illustrated in FIG. 2, the hurricane model 290 can generate forcing data 240 that is input to the tidal model 210. Inputs to the hurricane model 290 include the observed starting point of the storm (latitude and longitude) and the time of the observation, an estimate or measurement of the average central pressure Pc, an average forward speed in km/hr, and a final location for the storm. The final location for the storm can be, for example, the storm's land fall location or a location further inland. The radius of maximum winds is an indicator of the size of the storm and is also an input to the hurricane model 290. The winds expected due to the hurricane track can be overlaid over a general wind present at the start of the model, so the winds at a location can shift and increase as the hurricane approaches.

The pressure and velocity outputs 650 of the hurricane model are additional forcing inputs to the tidal model 210.

In an exemplary embodiment of the hurricane module, the pressure P at a radius r from the storm center is found as follows:

$$P = P_c + (P_n - P_c) e^{-(r_m/r)^b} \quad (19)$$

where $P_c$ is the central pressure, $P_n$ is the environmental pressure (the climatological mean for the region and month), $r_m$ is the radius of maximum winds and b provides a scaling on the profile shape.

As illustrated at step 610 of FIG. 6, the parameter b is empirically defined by $$b = 1.5 + (980 - P_c)/120 \quad (20)$$

The symmetric, gradient-level azimuthal wind component is estimated by $$v = \left[ b \left( \frac{r_m}{r} \right)^b \frac{(P_n - P_c)}{\rho} e^{-(r_m/r)^b} - \frac{r^2 f^2}{4} \right]^{\frac{1}{2}} - \frac{rf}{2} \quad (21)$$

where $\rho$ is the air density and f is the Coriolis parameter.

A first order asymmetry is included by adding the cyclone translation to the symmetric field and rotating the field so that the maximum wind is 70° to the left (right in the Northern Hemisphere) of the direction of cyclone motion. The radial wind field is constructed by rotating the flow to a constant inflow angle of 25° outside the radius of maximum winds.

In the exemplary embodiment described herein, the asymmetry angles cannot be changed by the user, however, the system can be adjusted by an administrator to use greater or lesser asymmetry angles if desired.

This hurricane model 290 is not expected to represent the full field of synoptic scale features with a high degree of accuracy. The main aspect for storm surge and wave forcing is that the model parameterizes the mesoscale forcing in the vicinity of the maximum winds reasonably well, allowing the user to determine the effects of a storm on water levels in the coastal areas along the storm's path.

There are several suitable ways to displaying the system output. Referring again to FIG. 2, the system 200 includes first display module 280 OMDISP, which plots simulated variables at designated levels and times during the model simulation, and a second module 285 TSPLOT, which displays the time varying station output variables (sea level and currents). The system also allows display of bathymetry information in a 2-dimensional form using a BATHPLOT program, and display of boundary conditions derived from FES99 with and without IHO tide station data using a PLOTIDE subroutine (not shown).

Initial tests that evaluate the system's ability to predict storm surge with and without an included hurricane forecast model are discussed in Preller, R. H., Posey, P. G., and Dawson, G. M. "Hurricane Isabel: A Numerical Model Study of Storm Surge Along the East Coast of the United States", presented at the 2005 AMS Annual Meeting, San Diego, Session P.2.9.

FIG. 7 compares the forecast track 710 produced using the system 200 with an included hurricane model 290 with the observed track 720 of Hurricane Isabel, and with forecasts 730 and 740 accomplished with the Navy's NOGAPS and COAMPs forecasting systems. Tidal stations are identified within the model domain 750 at Beaufort N.C, Cape Hatteras N.C., Duck N.C., Virginia Beach, Va., Chesapeake Beach, Va., Windmill, Va., Solomon's Island, Md., and Baltimore, Md. The system 200 was used to predict storm surge in a forecast mode. The forecast models applied to the tests were complete atmospheric forecast systems represented by NOGAPS and COAMPS models and the hurricane model 290 of FIG. 6 above. The model 200 was then run after the storm passed with the observed track (to provide start and end points) and storm intensity using the hurricane model 290 with a value of 100 km for the radius of maximum winds (RMW) to produce track 710.

The following table illustrates validation of the system 200 with and without the hurricane model 290. Tests 1-3 are forecasts with no wind forcing, with the hurricane model 500 with an assumed radius of maximum winds (RMW) of 60 km, and with a hurricane model 500 with an assumed 70 km RMW, respectively. Test 4 is a forecast using NOGAPS for wind forcing data. Test 5 is a test using COAMPS forcing data. Tests 6, 7, and 8 are hindcasts using the Holland hurricane model with RMW values of 70, 90, and 100 km, respectively. Although all of these model runs included tidal forcing, assimilation of tidal observation was not included.

| Experiment | Model | Wind Forcing | Simulation Time |
|---|---|---|---|
| 1 | forecast | none | 00Z 17th-00Z 20th |
| 2 | forecast | Holland 60 km | 21Z 17th-22Z 19th |
| 3 | forecast | Holland 90 km | 21Z 17th-01Z 20th |
| 4 | forecast | NOGAPS | 00Z 18th-00Z 20th |
| 5 | forecast | COAMPS | 00Z 18th-00Z 20th |
| 6 | hindcast | Holland 70 km RMW | 21Z 17th-15Z 19th |
| 7 | hindcast | Holland 90 km RMW | 21Z 17th-15Z 19th |
| 8 | hindcast | Holland 100 km RMW | 21Z 17th-15Z 19th |

The following table summarizes the test results for each of the model combinations run to evaluate the effects of Hurricane Isabel on water levels along the east coast of the United States. The following table shows the Absolute Mean Error (AME) and Root Mean Square Error (RMS) of the peak surge associate with each model run. Values in parentheses were calculated using only the Beaufort, N.C.; Chesapeake, Va.; and Baltimore, Md. stations, the only stations with uninterrupted observations throughout the storm.

| Model | Height (meters) | | Time (RMS) | |
|---|---|---|---|---|
| | AME | RMS | AME | RMS |
| COAMPS | .62 (.79) | .76 (.95) | 75 (58) | 90 (64) |
| NOGAPS | .72 (.88) | .83 (1.0) | 148 (193) | 305 (254) |
| Forecast 60 | .52 (.49) | .63 (.68) | 90 (128) | 121 (120) |
| Forecast 90 | .68 (.84) | .94 (1.1) | 168 (100) | 170 (100) |
| Hindcast 70 | .45 (.70) | .55 (.61) | 134 (68) | 182 (69) |
| Hindcast 90 | .25 (.42) | .39 (.6) | 112 (68) | 51 (69) |
| Hindcast 100 | .22 (.43) | .38 (.55) | 112 (65) | 50 (68) |

FIG. 8 is a table illustrating the peak water level and time of peak surge for each of the stations and simulations above.

Other embodiments include computer software and computer programs, as well as computer systems and computer readable media having programs for implementing the methods discussed above. A computer system is generally applicable for the various embodiments described according to the present invention. The computer system can include a processor, a volatile memory, e.g., RAM, a keyboard, a pointing device, e.g., a mouse, a nonvolatile memory, e.g., ROM, hard disk, floppy disk, CD-ROM, and DVD, and a display device having a display screen. Memory can store program instructions that are executable by a processor to implement various embodiments of a method in accordance with the present invention. A communications device may also be connected to enable information exchange between the computer system and other devices.

It should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include FORTRAN, XML, C++ objects, Java and Microsoft Foundation Classes (MFC).

Other embodiments of the invention include methods of receiving, displaying, further processing, making available for download, and/or transmitting the results generated by the equations, the system 200 and methods discussed herein. Other embodiments of the invention include computer systems and computer readable media having programs or applications for receiving, displaying, further processing, and transmitting the results or information derived from the results, as well as for making the results available for retrieval by other users. The results can be the ocean surface height and current information including speed and direction in tabular, graphical, time series, or other formats.

The invention has been described with reference to certain preferred embodiments. It will be understood, however, that the invention is not limited to the preferred embodiments

The invention claimed is:

1. A method for estimating ocean current and ocean surface height deviation from a reference water level for at least one earth location within a geographic grid, the method comprising:
   receiving water depth data from a global bathymetry database;
   generating atmospheric forcing information for the geographic grid with a computerized hurricane model having inputs of least one of: observed starting point, time sequence of radius of maximum winds, average central pressure, average forward speed, and final storm location;
   a computerized ocean model receiving the atmospheric forcing information and estimating the ocean current and the ocean surface height deviation for the at least one earth location; and
   at least one of: displaying the ocean current and the ocean surface height deviation to a user, transferring the ocean current and the ocean surface height deviation to another computer, and storing the ocean current and the ocean surface height deviation for further retrieval.

2. A method according to claim 1, wherein the computerized hurricane model incorporates rotation and asymmetry.

3. The method according to claim 2, where the computerized hurricane model has as inputs: observed starting point, time sequence of radius of maximum winds, average central pressure, average forward speed, and final storm location.

4. The method as in claim 1, further comprising: estimating a current and an ocean height deviation for all the geographic grid points.

5. A method as in claim 1, wherein the atmospheric forcing data comprises at least one of surface wind speed and direction and pressure.

6. A method as in claim 1, wherein said estimating a current and ocean height deviation includes repeating the estimation at a pre-determined frequency of estimation.

7. A method as in claim 1 further comprising: receiving user-selected grid boundaries.

8. A method as in claim 1 further comprising: receiving user-selected grid resolution.

9. A method as in claim 1, further comprising: limiting the grid boundaries and grid resolution so a total number of grid points does not exceed 500×500.

10. A method as in claim 1, further comprising:
    receiving user-selected frequency of estimation for grid points.

11. A method as in claim 1, further comprising:
    receiving tidal station data from at least one tidal station within the grid.

12. A method according to claim 1, wherein the bathymetric database is a DBDB2 database.

13. A method according to claim 1, wherein the computerized ocean model is a constant density ocean model.

14. A method according to claim 1, wherein the computerized ocean model is a one layer (2D) ocean model.

15. Computer readable media having a program for operating the method of claim 1.

16. A method for estimating ocean current and ocean surface height deviation from a reference water level for at least one earth location within a geographic grid, the method comprising:
    receiving water depth data from a global bathymetry database;
    generating atmospheric forcing inforrriation for the geographic grid with a computerized hurricane model having inputs of least one of: observed starting point, time sequence of radius of maximum winds, average central pressure, average forward speed, and final storm location;
    a computerized ocean model receiving the atmospheric forcing information and estimating the ocean current and the ocean surface height deviation for the at least one earth location; and
    displaying the at least one of ocean surface height and current information to a user.

17. Computer readable media having a program for operating the method of claim 16.

* * * * *